March 24, 1970   E. C. THOBROE ET AL   3,502,200

APPARATUS FOR TRANSPORTING ARTICLES

Filed April 24, 1967   3 Sheets-Sheet 1

INVENTORS
EIVIND CHRISTIAN THOBROE
DAVID SIDNEY KEYSE
ROGER MALCOLM DALE

By Cushman, Darby & Cushman
Attorneys

INVENTORS
EIVIND CHRISTIAN THOBROE
DAVID SIDNEY KEYSE
ROGER MALCOLM DALE

BY Cushman, Darby & Cushman
Attorneys

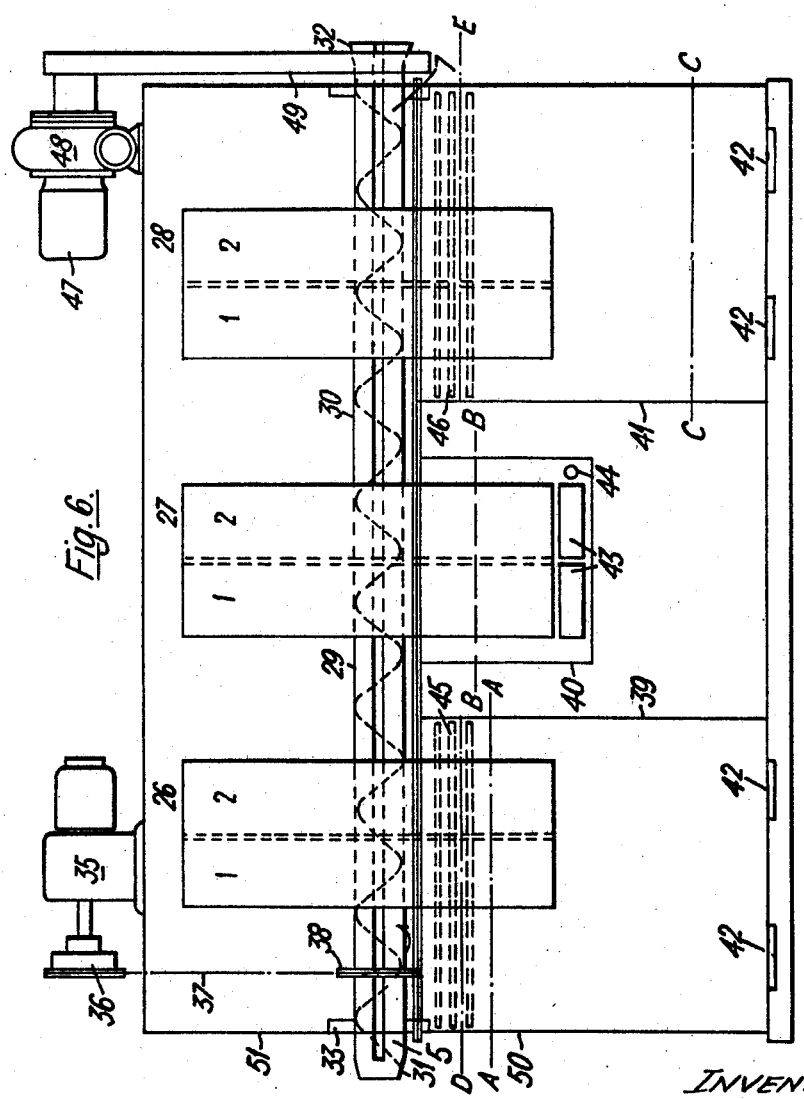

United States Patent Office 3,502,200
Patented Mar. 24, 1970

3,502,200
APPARATUS FOR TRANSPORTING ARTICLES
Eivind Christian Thobroe and David Sidney Keyse, Stonehouse, and Roger Malcolm Dale, Runcorn, England, assignors to Hoffmann Manufacturing Company Limited, Chelmsford, and Imperial Chemical Industries Limited, London, England, both corporations of Great Britain
Filed Apr. 24, 1967, Ser. No. 633,182
Claims priority, application Great Britain, May 12, 1966, 21,075/66
Int. Cl. B65g 33/02
U.S. Cl. 198—213                                    12 Claims

ABSTRACT OF THE DISCLOSURE

Apparatus for transporting small articles down into and up out of a fluid treatment medium, comprising a pair of spiral channels with partly foraminate walls, winding in opposite senses, intercommunicating at their outer ends and rotatable as an integral whole about a substantially horizontal axis, preferably with horizontally transporting feed and discharge channels in the form of Archimedean screws connected to the inner ends respectively of the two spirals. Pairs of spirals, each pair partly immersed in a separate vessel containing a treatment medium and linked to their neighbours along a common axis by lengths of similarly connected Archimedean screws, are employed for a sequence of treatments, for instance for treatments in degreasing solvent liquor/vapour for critical cleaning of bearing balls and rollers with reduced risk of shock and abrasion.

Figure 1:
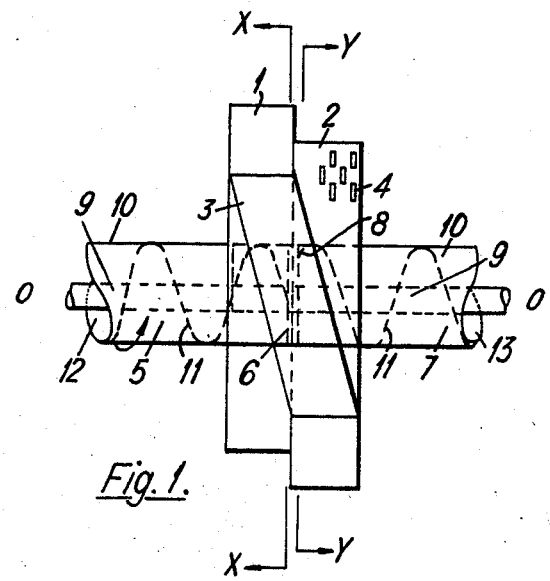

The present invention relates to apparatus suitable for transporting articles through a treatment zone, to embodiments of apparatus suitable for transporting articles through a series of treatment zones and to methods of treating a continuous flow of articles in fluid media.

There are many processes carried out in industry wherein articles, particularly metal articles, have to be submitted to treatment in a liquid or gaseous medium. When the articles are of suitable shape and large enough to be suspended individually on jigs or wires there is no great problem in conveying them through one or more treatment zones, for instance by employing a monorail conveyor to carry the jigs through the zones. Small parts that cannot be handled in this way can sometimes be carried, a large number at a time, in baskets suspended from a conveyor or may lie on a belt conveyor which itself travels through the treatment medium. There are, however, critical processes where close-lying small parts would not receive adequate treatment of all surfaces and where vigorous rotation of basket loads to expose all surfaces to the treatment medium, and even the loading and unloading of baskets, would cause surface abrasion and indentation sufficient to render the parts unsuitable for their intended use or to lead to difficulties in differentiating between acceptable minor damage and unacceptable damage during subsequent inspection.

The aim of the present invention is to provide an apparatus suitable for transporting small articles through a treatment zone or through a plurality of treatment zones consecutively in such a manner that all surfaces of the articles are adequately exposed to the treatment medium but mechanical shock is reduced to negligible proportions and abrasion between the articles is reduced to a very low level.

The present invention provide an apparatus suitable for transporting articles through a treatment zone, which comprises a treatment unit comprising two conveying channels each in the form of a spiral mounted so as to be rotatable as an integral whole about a substantially horizontal axis and so that the spiral channels wind in opposite senses, said channels being in communication with each other at their outer ends and at least a part of the casing of each channel being of foraminate structure, together with means for rotating the unit about said substantially horizontal axis.

If articles are fed into the open inner end of one spiral channel and the apparatus is rotated about the said axis in the appropriate direction the articles will move through the two spiral channels in series and be delivered from the open inner end of the second spiral. In the first spiral they will move from the centre outwards, i.e. they will travel downwards under the influence of gravity, at the outer end of this spiral they will be transferred to the second spiral and will move upwards therein back to the centre. They can thus be made in effect to travel through a considerable length of channel with very little lateral movement.

By the term "substantially horizontal axis" in the penultimate paragraph we means that the axis may be horizontal or may if desired be inclined by up to about 10° to the horizontal in order to assist feeding articles into and discharge out of the spiral channels.

In use, the apparatus is positioned so that a portion of the two spiral conveyors is immersed in a fluid treatment medium, for instance by placing a vessel containing the appropriate medium around a lower portion of the rotating conveyor, and as the articles pass through the spiral channels they are carried down into and then lifted out of the treatment zone and come into contact with the medium which can enter and leave through the perforations in the conveyor casings.

According to the invention there is therefore also provided a method of treating solid articles with a liquid, vaporous or gaseous medium which comprises bringing the articles into contact with the said medium while passing them through the spiral channels of an apparatus comprising two spiral conveyors as hereinbefore defined.

The spiral channels of the apparatus may be totally enclosed, apart from the perforations in their casings as aforesaid, and may be of any desired cross-section which will accommodate the articles to be treated and allow them to pass through unhindered. For most purposes, however, an "open-topped" channel is adequate and for case of construction we prefer to make the channel of U-shaped section so that the articles can be held in the base of the U-shape in the bottom of each turn of the spiral. Furthermore the base of the U may be flattened so that the section of the channel walls form three sides of a rectangle, the fourth open side of the channel facing towards the rotational axis.

The number and position of the perforations needed in the casing of each channel will depend on the type of treatment to be given to the articles. It should however be borne in mind that even with an "open-topped" channel perforations must be provided at the outlet end in order to allow drainage of the treatment medium and thus prevent pumping of the medium out of the exit channel along with the articles. This is particularly important when the medium is a liquid but can also occur with heavy vapours and gases. In general we prefer to make the "base" of the channel, e.g. the base of the U in the case of the U-shaped channel, a foraminate structure throughout its length.

As aforesaid, the two spiral channels are in communication with each other at their outer ends. This may for example be arranged by providing a short length of channel with the walls shaped for smooth cross-over from the plane of one spiral to the other or by shaping a simple communicating port if the spirals are placed close together as by having their inner walls in contact or using a common inner wall for the two spirals. In order to provide the smoothest transfer between the outer ends of the spirals we prefer to link these ends by a short length of helical channel. In this case we have found that the best arrangement, particularly as it takes up the least space, is to place the two spirals close together and employ not more than three-quarters of a turn of helical channel to connect the outer ends of the spiral channels and thus to cross over from one spiral to the other.

Furthermore, within the scope of the invention, arrangements for smooth feeding of articles into the spiral channels and/or discharging them therefrom can be provided by connecting a length of helical channel in the form of an Archimedean screw conveyor to the inner end of the input and/or the output spiral, these screw conveyors being mounted so as to be rotatable as an integral whole with the spiral conveyors about the same substantially horizontal axis.

It will be understood that the pair of spiral treatment conveyors will always be mounted side by side, the planes in which the spiral channels lie being substantially vertical and parallel to each other. In the form of the apparatus described in the preceding paragraph, therefore, wherein the spiral channels are each provided with a helical conveyor for feeding and discharge respectively it will generally be most convenient to place these helical conveyors in line on opposite sides of the pair of spirals so that the feed and discharge points are at opposite ends of the assembly along the rotational axis. If, however, it is desired to have the feed and discharge points close together this can be arranged by making the feed and discharge helices coaxial with each other, i.e. by constructing one helical channel to wind around the other so that they are both on the same side of the pair of spirals along the rotational axis. One helical channel will then be connected into the nearer spiral channel and the other helical channel will pass through the plane of this spiral to connect with the more remote spiral.

A preferred embodiment of apparatus in its simplest form comprises, therefore, a treatment unit which comprises two spiral conveyors mounted so as to be rotatable as an integral whole about a substantially horizontal axis so that their spiral channels wind in opposite senses and are in communication with each other at their outer ends, preferably by way of a short length of helical channel, and this unit is provided with a feed channel and a discharge channel by connecting one end of a length of Archimedean screw conveyor to the centre of each spiral channel so as to be rotatable with the spirals, which spirals are of foraminate structure along at least a part of their walls. Means for rotating this assembly about the said axis are also provided. In use, a vessel containing a fluid treatment medium is positioned so that a lower portion of the rotating spirals is immersed in the medium and the feed and discharge channels may suitably protrude through the side walls of the vessel or more preferably over the rim of these side walls.

One treatment unit as described in the preceding paragraph allows articles to be transported through one treatment zone. Within the scope of the invention, however, apparatus suitable for transporting articles through a plurality of treatment zones consecutively, arranged to provide any desired combination of treatments, is provided by linking together two or more of the said treatment units in series and this can most suitably be accomplished by connecting the centre of the discharge spiral channel of one unit to the centre of the feed spiral channel of the next unit in the series by means of a helical channel in the form of an Archimedean screw conveyor. Each spiral treatment unit can then be partially immersed in a separate treatment medium and the interconnecting helical conveyors are made of suitable length to bridge from one treatment zone to the next, passing for instance through or over the side walls of vessels holding the treatment media. Preferably the series of spiral treatment units alternating with helical connecting units is also terminated at each end by an Archimedean screw helix for smooth feeding and discharge of articles into and out of the respective end spirals. It will be understood that to obtain transport of articles through such an assembly of units from end to end as the assembly is rotated all the helical channels must wind in the same sense.

An apparatus according to the invention may suitably be employed for transporting any small articles, for instance nuts, bolts, screws, balls and rollers for bearings, stampings and pressings, through one or more treatment zones. The treatment medium may be a gas atmosphere, a vapour for example a degreasing solvent vapour, or an organic or aqueous liquid including coating compositions provided that these are not prone to become viscous or to set, for example through evaporation and consequent loss of a solvent component during application. The apparatus is very suitable for transporting articles through a degreasing process, for instance through an aqueous degreasing process or one in which the treatment medium is an organic solvent applied in the liquid or vapour state or by using a combination of liquor and vapour treatments in different stages of the degreasing process. The apparatus may also be employed to apply a protective lubricant to finished or part-processed articles, in which case the treatment medium may suitably be a solution of lubricant in an organic solvent.

An apparatus according to the invention may very usefully be adapted to provide a high quality cleaning process for bearing balls. Very stringent requirements attach to the cleaning of bearing balls before final inspection and heretofore no completely satisfactory cleaning procedure has been available. Apart from the obvious requirement that the balls must have a high quality surface finish and be free from any imperfections of shape that would render them unfit for service, they are also required to be scrupulously clean and free from the slightest surface damage which might interfere with automatic inspection methods. Up-to-date inspection devices are sensitive to the presence of traces of contamination and to slight departure from true shape that would be unnoticed on visual inspection so that very high rejection rates can be experienced if the pre-cleaning process causes very slight surface damage or allows any surface soil to remain on the balls. We have found that a cleaning process using a transporting apparatus according to the invention to carry the balls through three separate degreasing stages, each employing an organic solvent as the cleaning medium, solves this most troublesome problem. The preferred sequence of treatments provides degreasing in boiling degreasing solvent liquor in the first stage, cleaning in cold degreasing solvent liquor which is excited by an ultrasonic transducer in the second stage and washing in vapour from boiling degreasing solvent in the third stage. The invention will be discussed in detail with special reference to this application.

Figure 2:
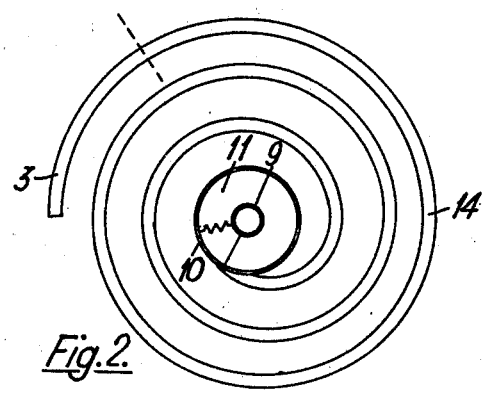
Figure 3:
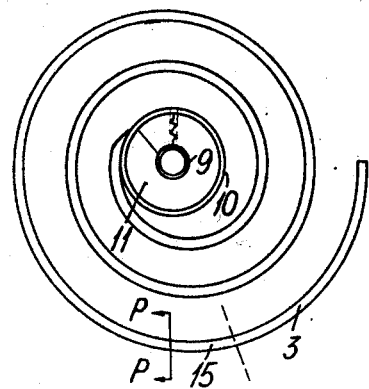
Figure 4:
Figure 5:
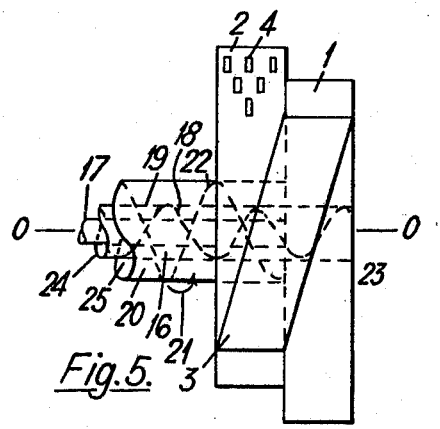

In the schematic drawings accompanying the provisional specification, which are not to scale, FIG. 1 shows a side elevation along the rotational axis of a transporting apparatus according to the invention consisting of one treatment unit of two spiral conveyors linked by a short length of helical channel and connected at each end to an Archimedean helix for feeding and discharging articles. FIG. 2 shows one spiral in section along line X—X of FIG. 1, and FIG. 3 shows the other spiral in section along the line Y—Y of FIG. 1. FIG. 4 shows a section through the spiral channel along line P—P of FIG. 3. FIG. 5 shows a similar combination of interconnected spirals with helical feed and discharge channels as FIG. 1 but with the feed and discharge on the same side of the spiral unit. FIG. 6 shows a general arrangement of plant suitable for degreasing bearing balls incorporating a transporting apparatus according to the invention.

In FIG. 1 a spiral conveyor 1 having its spiral channel winding clockwise from the centre outwards when viewed from the left-hand side of the drawing is mounted with the plane of its spiral channel vertical in side-to-side contact with another spiral conveyor 2 having its spiral channel winding in the opposite sense and the outer ends of the spiral channels are connected together by way of a part turn of helical channel which is indicated at 3. The peripheral walls of both spiral channels are perforated throughout their length as indicated at 4. 5 indicates a length of Archimedean helix connecting at 6 with the centre of the spiral channel of conveyor 1, and 7 indicates a length of similar Archimedean helix connecting at 8 with the centre of the spiral channel of conveyor 2. In the case of both helices 9 is the core, 10 is the outer wall and 11 indicates the helical membrane. The helical channels are all right-handed and the whole assembly is connected together so as to be rotatable as a whole about the horizontal axis O—O. Thus if the assembly is rotated in the direction shown by the arrow and articles are fed into the end 12 of helical channel 5 they will be conveyed by the action of the helices and spirals right through the apparatus and will be delivered from the end 13 of helical channel 7.

FIG. 2 shows the spiral channel 14 of conveyor 1 together with part of the helical channel 3 which is connected to its outer end. It also shows the core 9, the outer wall 10 and the helical membrane 11 at the end of the Archimedean helix 5 of FIG. 1 where this helix connects with the inner end of spiral channel 14. FIG. 3 shows similar details for the spiral channel 15 of conveyor 2. FIG. 4 shows a suitable flattened U-shape for the spiral channels 14 and 15, the perforations 4 of FIG. 1 being in the base of the U as shown.

FIG. 5 shows a similar arrangement of parts to FIG. 1 with the exception that feed and discharge Archimedean helices 5 and 7 of FIG. 1 have now been brought out of the spiral conveyors on the same side and are therefore made coaxial with each other, and the positions of spiral conveyors 1 and 2 have been exchanged. In FIG. 5 the feed helix remains unchanged but passes through the plane of spiral conveyor 2 to connect with the inner end of spiral conveyor 1 and is now shown as 16. The core is numbered 17, its helical membrane 18, and 19 serves as its outer wall and also as the inner wall of the outer Archimedean helix 20, which itself has an outer wall 21 and helical membrane 22. 20 is therefore the discharge helix and is connected to the inner end of the spiral channel of conveyor 2 as indicated at 23. This discharge helix and the helical channel 3 which connects the outer ends of the spiral channels must now be of left-hand construction so that if articles are fed into the end 24 of the inner helix 16 and the whole apparatus is rotated about the axis O—O in the direction indicated by the arrow they will be transported into and through the two spirals and be discharged from the end 25 of the outer helix 20.

Although the Archimedean helices have been referred to as feed and discharge helices respectively in the preceding paragraph, it should be understood that with both embodiments of apparatus shown in FIG. 1 and FIG. 5 respectively the direction of movement of articles through the apparatus is reversible by merely reversing the direction in which it is rotated about its axis. Thus the feed and discharge points are interchangeable at will—a feature which can be useful in cleaning the apparatus should the treatment spirals become contaminated during working.

The apparatus shown in general arrangement in FIG. 6 contains three treatment units 26, 27, 28 each comprising two spiral conveyors 1 and 2 linked at their outer ends by a short length of helical channel as discussed with reference to FIG. 1. 5 and 7 are respectively feed and discharge helices arranged as in FIG. 1 but this time connected to the centres of the input and output spirals of the separate treatment units 26 and 28. 29 is an Archimedean helix connecting the centre of the output spiral of unit 26 to the centre of the input spiral of unit 27, and 30 is another Archimedean helix connecting units 27 and 28 together in the same manner. It is preferred to give the outer wall of the feed helix 5 a slight taper and to give the outer wall of the discharge helix 7 a slight flare for the last few inches to their open ends as indicated at 31 and 32 respectively, so as to assist the feeding and discharge of articles, but this is not essential. The whole assembly of treatment units and Archimedean helices is connected together sufficiently rigidly to be rotated as a whole in trunnion bearings 33 and 34 by means of electric motor 35, reduction gear 36, chain drive 37 and sprocket 38. In use the whole transporting assembly is rotated in the direction indicated by the arrow so that articles fed into the open end of feed helix 5 are transported right through the assembly of spirals and helices and are delivered from the open end of the discharge helix 7. 39, 40 and 41 are degreasing tanks which in use are filled with liquid degreasing solvent, preferably trichloroethylene, up to levels A—A, B—B and C—C respectively. Tanks 39 and 41 are fitted with heating means such as electric contact heaters indicated at 42 for maintaining the degreasing solvent at the boil. Tank 40 is unheated but contains ultrasonic transducers as indicated at 43, and a water-cooled coil 44 for cooling the solvent liquor. Tanks 39 and 41 are fitted with water-cooled condensing coils 45 and 46 respectively around the upper portion of their walls to prevent the escape of solvent vapour and keep the vapour-air interfaces at approximately the levels D and E in the respective tanks. 47 and 48 are an electric motor and fan for exhausting air to the outside atmosphere by suction through duct 49 so as to collect any solvent vapour which may escape with the articles from the discharge end 32 of the conveyor assembly. 50 and 51 are the lower and upper portions of a casting which encloses the apparatus except for the feed and discharge ends of the conveyor assembly. Besides supporting the motors, gears, trunnion bearings and fan, this casing serves to prevent escape of solvent vapour from the rotating treatment units into the workshop atmosphere and to prevent the ingress of air-borne dust. The peripheral walls of the spiral conveyors of treatment units 26, 27 and 28 are of foraminate structure throughout their length. When the apparatus is to be used for cleaning bearing balls the holes in these walls are preferably made in the form of slots set as shown at 4 in FIG. 1. The most suitable size of the slots will depend on the size of the balls being treated. For instance, slots ½ inch long and $\frac{1}{16}$ inch wide are most suitable for ⅛ inch diameter balls. It will be seen that when the apparatus is in use the articles passing through the transporting assembly come into contact with boiling solvent liquor as they pass through treatment unit 26, are submitted to ultrasonic vibration in contact with cool solvent liquor in unit 27 and finally receive a treatment in hot solvent vapour in unit 28. Pipe connections (not shown) are provided to return clean solvent collected from condensing coils 45 and 46 to ultrasonic tank 40, to convey a solvent overflow from the upper part of tank 40 to the base of tank 39 and to convey a solvent overflow from the upper part of tank 39 to the liquor sump of vapour degreasing tank 41. Arrangements (not shown) are also made to circulate solvent from ultrasonic tank 40 through a filter and back to this tank continuously. By maintaining these solvent circulations the solvent in ultrasonic tank 40 is kept quite clean, accumulation of contamination in the liquor degreasing tank 39 is largely prevented and the contamination is concentrated only in the liquor sump of the vapour degreasing tank 41, with which the articles do not come into contact. Apparatus in accordance with FIG. 6 and operated in the described manner has been found entirely suited to the cleaning of balls and rollers for precision bearings before inspection and may also be employed for similar cleaning operations on other small articles.

What we claim is:

1. A conveying apparatus suitable for continuously conveying small articles through a medium which comprises in combination at least one pair of two immediately adjacent flat spiral conveying channels winding in opposite senses about their horizontal axis and each spiral having an outer and inner end, relatively short means in communication with each of the outer ends of said two channels, and at least a part of the casing of each conveying channel being of a foraminate structure, each pair of the said conveying channels having feeding and discharge helical channels in the form of an Archimedean screw connected respectively to the inner ends of the conveying channels of the said pair of conveying channels, said feeding and discharge channels functioning as feed and discharge means for moving articles to and from the said pair of conveying channels, the whole assembly of said conveying channels and said helical channels being mounted as an integral whole whereby the whole assembly is rotatable about the substantially horizontal axis thereof, and means for rotating the said assembly about the said axis.

2. Apparatus according to claim 1 wherein the flat spiral conveying channels are of U-shaped section with an open top.

3. Apparatus according to claim 1 wherein the cross section of the flat spiral conveying channel walls forms three sides of a rectangle and the fourth side is open.

4. Apparatus according to claim 3 wherein one of the walls of the flat spiral conveying channels is of foraminate structure throughout the length thereof.

5. Apparatus according to claim 1 wherein the said relatively short communication means is a helical channel of less than one helical turn.

6. Apparatus according to claim 5 wherein the relatively short communication means is a channel of not more than three-quarters of a turn of the helix.

7. Apparatus according to claim 1 wherein the said feeding and discharge helical channels extend, respectively, in opposite directions from their points of connection with the inner ends of each said conveying channels of the said pair.

8. Apparatus according to claim 1 wherein the said feeding and discharge helical channels extend, respectively, in the same direction from their points of connection with the inner ends of each said conveying channels of the said pair.

9. Apparatus according to claim 8 wherein the said feeding and discharge helical channels are co-axial one within the other, with their helical channels winding in opposite senses.

10. Apparatus according to claim 7 wherein a plurality of pairs of said conveying channels are connected in series at the ends of the said feeding and discharge helical channels.

11. Apparatus according to claim 10 wherein each pair of said spiral conveying channels are at least partially contained in a separate vessel adapted to receive a fluid medium.

12. Apparatus according to claim 1 wherein the said relatively short communication means is a communication port between the immediately adjacent walls of the said spiral conveying channels.

References Cited

UNITED STATES PATENTS

| | | | |
|---|---|---|---|
| 262,472 | 8/1882 | Prewitt | 103—99 |
| 1,154,675 | 9/1915 | Vandreuil | 198—136 |

FOREIGN PATENTS

| | | |
|---|---|---|
| 567,327 | 2/1945 | Great Britain. |

RICHARD E. AEGERTER, Primary Examiner

U.S. Cl. X.R.

134—65, 132